United States Patent
Karaoguz et al.

(10) Patent No.: US 10,685,360 B2
(45) Date of Patent: Jun. 16, 2020

(54) SYSTEM AND METHOD FOR UPDATING ADVERTISING CONTENT FOR A RECORDED PROGRAM

(75) Inventors: Jeyhan Karaoguz, Irvine, CA (US); Nambirajan Seshadri, Irvine, CA (US); Henry Samueli, Corona Del Mar, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 2136 days.

(21) Appl. No.: 12/948,943

(22) Filed: Nov. 18, 2010

(65) Prior Publication Data

US 2011/0178853 A1    Jul. 21, 2011

Related U.S. Application Data

(60) Provisional application No. 61/295,282, filed on Jan. 15, 2010.

(51) Int. Cl.
  *G06Q 30/02*    (2012.01)

(52) U.S. Cl.
  CPC ......... *G06Q 30/02* (2013.01); *G06Q 30/0241* (2013.01)

(58) Field of Classification Search
  CPC ..................................................... G06Q 30/02
  USPC ............................................................ 705/14
  See application file for complete search history.

(56) References Cited

U.S. PATENT DOCUMENTS

| | | | |
|---|---|---|---|
| 2007/0136742 A1* | 6/2007 | Sparrell | G11B 27/036 725/32 |
| 2009/0210899 A1* | 8/2009 | Lawrence-Apfelbaum et al. | 725/34 |

OTHER PUBLICATIONS

Object-based Services with Optimization in Layered Multi-Source Video Delivery; Lai-Tee Cheok; dissertation; Columbia University; 2006; pp. i-ix and pp. 160-176 reproduced in part with www.proquest.dialog.com (Year: 2006).*

* cited by examiner

*Primary Examiner* — Eric R Netzloff
*Assistant Examiner* — Michael R Stibley
(74) *Attorney, Agent, or Firm* — Foley & Lardner LLP

(57) ABSTRACT

A system and method for updating advertising content for a recorded program (e.g., recorded on personal video recorder equipment), substantially as shown in and/or described in connection with at least one of the figures, as set forth more completely in the claims.

22 Claims, 5 Drawing Sheets

SYSTEM AND METHOD FOR UPDATING ADVERTISING CONTENT FOR A RECORDED PROGRAM

CROSS-REFERENCE TO RELATED APPLICATIONS/INCORPORATION BY REFERENCE

The present U.S. Utility Patent Application claims priority pursuant to 35 U.S.C. § 119(e) to the following U.S. Provisional Patent Application, which is hereby incorporated herein by reference in its entirety and made part of the present U.S. Utility Patent Application for all purposes:
1. U.S. Provisional Application Ser. No. 61/295,282, entitled "SYSTEM AND METHOD FOR UPDATING ADVERTISING CONTENT FOR A RECORDED PROGRAM," filed Jan. 15, 2010.

The present U.S. Utility Patent Application is also related to the following U.S. Patent Applications, which are hereby incorporated herein by reference in their entirety and made part of the present U.S. Utility Patent Application for all purposes:
1. U.S. patent application Ser. No. 12/948,928, entitled "SYSTEM AND METHOD IN A PROGRAM RECORDER FOR MANAGING ADVERTISEMENT PRESENTATION", filed Nov. 18, 2010, pending;
2. U.S. patent application Ser. No. 12/948,954, entitled "SYSTEM AND METHOD FOR PROVIDING USER SPECIFICATION OF ADVERTISING CONTENT", filed Nov. 18, 2010, pending;
3. U.S. patent application Ser. No. 12/948,975, entitled "SYSTEM AND METHOD FOR MONITORING AND REPORTING PRESENTATION OF RECORDED ADVERTISING CONTENT", filed Nov. 18, 2010, pending;
4. U.S. patent application Ser. No. 12/949,001, entitled "SYSTEM AND METHOD FOR PROVIDING VIEWER IDENTIFICATION-BASED ADVERTISING", filed Nov. 18, 2010, pending; and
5. U.S. patent application Ser. No. 12/949,049, entitled "SYSTEM AND METHOD FOR COMMUNICATING PROGRAMMING AND ADVERTISING CONTENT THROUGH DIVERSE COMMUNICATION NETWORKS", filed Nov. 18, 2010, pending.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

A viewer of recorded programming and advertising content may view such recorded content at a time that is significantly later than the time at which such programming and advertising content were originally provided. Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for updating advertising content for a recorded program (e.g., recorded on personal video recorder equipment), substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF VARIOUS ASPECTS OF THE INVENTION

Figure 1:
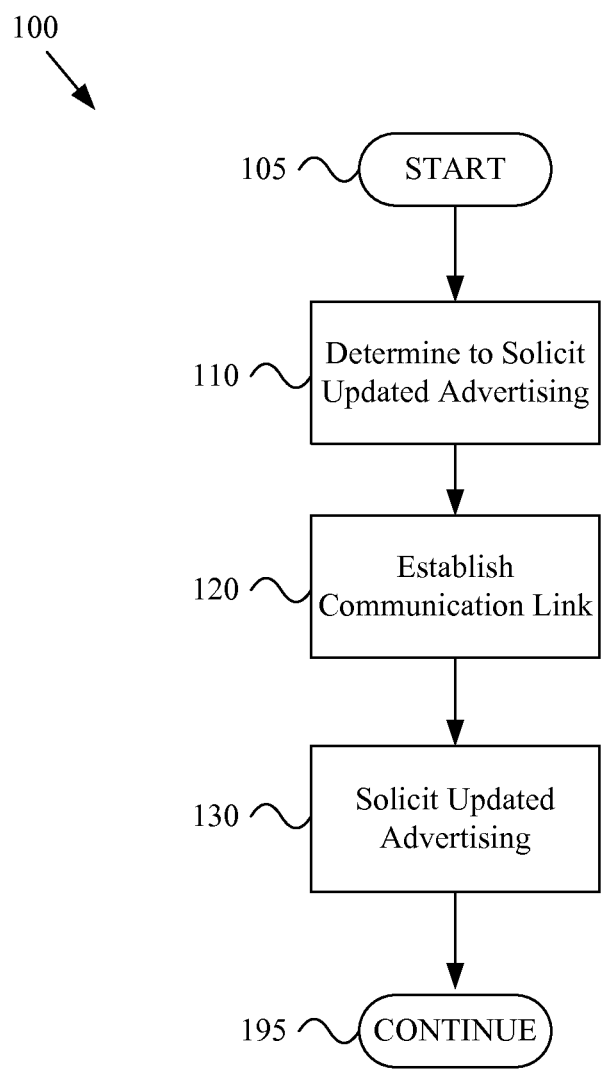
FIG. 1 shows a non-limiting exemplary flow diagram of a method for updating advertising content for a recorded program, in accordance with various aspects of the present invention.

The following discussion will refer to various communication modules, components or circuits. Such modules, components or circuits may generally comprise hardware and/or a combination of hardware and software (e.g., including firmware). Such modules may also, for example, comprise a computer readable medium (e.g., a non-transitory medium) comprising instructions (e.g., software instructions) that, when executed by a processor, cause the processor to perform various functional aspects of the present invention. Accordingly, the scope of various aspects of the present invention should not be limited by characteristics of particular hardware and/or software implementations of a module, component or circuit unless explicitly claimed as such. For example and without limitation, various aspects of the present invention may be implemented by one or more processors (e.g., a microprocessor, digital signal processor, baseband processor, microcontroller, etc.) executing software instructions (e.g., stored in volatile and/or non-volatile memory). Also for example, various aspects of the present invention may be implemented by an application-specific integrated circuit ("ASIC") and/or other hardware components.

Additionally, the following discussion will refer to various system modules (e.g., user equipment modules). It should be noted that the following discussion of such various modules is segmented into such modules for the sake of illustrative clarity. However, in actual implementation, the boundaries between various modules may be blurred. For example, any or all of the functional modules discussed herein may share various hardware and/or software components. For example, any or all of the functional modules discussed herein may be implemented wholly or in-part by a shared processor executing software instructions. Additionally, various software sub-modules that may be executed by one or more processors may be shared between various software modules. Accordingly, the scope of various aspects of the present invention should not be limited by arbitrary boundaries between various hardware and/or software components, unless explicitly claimed.

The following discussion may also refer to communication networks and various aspects thereof. For the following discussion, a communication network is generally the communication infrastructure through which a communication device (e.g., a video recorder, a personal video recorder, an electronic device with video recording capability, a television receiver, a television, a television controller, a portable communication device, a video content provider, a television program provider, an advertising video provider, a data network communication service provider, etc.) may communicate with other systems. For example and without limitation, a communication network may comprise a cable and/or satellite television communication network, a cellular communication network, a telecommunication network, a general data communication network (e.g., the Internet) a wireless metropolitan area network (WMAN), a wireless local area network (WLAN), a wireless personal area network (WPAN), any home or premises communication network, etc. A particular communication network may, for example, generally have a corresponding communication protocol according to which a device (e.g., user equipment comprising an electronic device with video recording capability) may communicate with the communication network. Unless so claimed, the scope of various aspects of the present invention should not be limited by characteristics of a particular type of communication network and/or communication protocol.

Additionally, the following discussion will at times refer to video content. Such video content may, for example, comprise various types of television programming (e.g., television programs, news programs, sports programs, music television, movies, television series programs and/or embedded advertisements, educational programs, live or recorded television programming, broadcast/multicast/unicast television programming, etc.). Such video content may, for example, comprise real-time television broadcast programming (or multicast or unicast television programming) and/or user-stored television programming that is stored in user equipment (e.g., a VCR, PVR, etc.). Such video content may also, for example, comprise advertising video content (e.g., an audio/video commercial, a still image advertisement, a user-interactive advertisement, advertising content embedded in and/or separate from television programming, etc.). Such video content may also, for example, comprise graphical and/or textual content that may be displayed on a television screen (e.g., an electronic program guide, user interface menu, a television set-up menu, a typical web page, a document, a graphical video game, etc.).

Various aspects of the present invention may, for example in user equipment (e.g., an electronic device comprising video recording capability), comprise receiving and recording video content, updating advertising content associated with recorded programming (e.g., in a solicited and/or unsolicited manner), and playing back the recorded video content with the updated advertising content.

As will be discussed in more detail below, in a non-limiting exemplary scenario, user equipment (e.g., a stand-alone video recorder, set-top box with video recording capability, video gaming device with video recording capability, a personal computing system with video recording capability, etc.) may be used to record and time-shift the presentation of a video program. The video program may have advertisements (e.g., video commercials) associated with the video program (e.g., embedded in the video program or otherwise associated with the video program). Various types of advertising may become outdated before the recorded video program is played back (or between multiple playbacks of the recorded video program). Examples of such time-sensitive advertising may, for example, comprise information of advertising specials with expiration dates, sales taking place during particular time windows, prices held for particular periods of time, services only available for a limited time, etc.

In such a scenario, in which a recorded program is associated with time-limited advertising, the user equipment may update advertising content associated with the recorded program (e.g., to ensure that advertising content is current). Such updated advertising content may be received (e.g., in a solicited and/or unsolicited manner) and presented to a user instead of outdated advertising content. For example, during playback of a recorded television program, updated current advertising content may be presented to the user instead of outdated advertising content.

The following discussion will generally address updating advertising content that corresponds to programming content (e.g., non-advertising content) that has been recorded. As will be discussed later, such recorded program content may be recorded in memory of a user device implementing the method 100. Also, such recorded program content may be recorded in a device other than the device implementing the method 100 that is communicatively coupled thereto. Such recorded program content may be stored in response to a user command to record, in response to a timer and a recording profile that is time-based, in response to a program identifier and a recording profile that is identity-based, etc.).

FIG. 1 shows a non-limiting exemplary flow diagram of a method 100 for updating advertising content for a recorded program, in accordance with various aspects of the present invention. Any or all aspects of the exemplary method 100 may, for example, be implemented in user equipment with video content recording capability (e.g., a personal video recorder, a television receiver (or set top box) with video recording capability, a gaming device with video recording capability, a personal computing device (e.g., handheld, notebook, laptop, desktop, etc.) with video recording capability, etc.

The exemplary method 100 may begin executing at step 105. The method 100 may begin executing in response to any of a variety of causes and/or conditions, non-limiting examples of which will now be provided. For example, the exemplary method 100 may begin executing in response to user input. Also for example, the exemplary method 100 may begin executing in response to a timer. Additionally for example, the exemplary method 100 may begin executing in response to a detected event or system condition. More non-limiting examples of various initiation causes and/or conditions will be provided in the following discussion.

The exemplary method 100 may, for example at step 110, comprise determining to solicit updated advertising for a recorded program. Various non-limiting examples of such determining will now be provided. For example, step 110 may comprise determining to immediately solicit updated advertising and/or may comprise determining when in the future to solicit updated advertising.

Step 110 may, for example, comprise determining to solicit updated advertising content in response to system conditions (e.g., conditions of user equipment implementing the method 100, communication network and/or channel conditions, etc). For example, step 110 may comprise determining bandwidth availability for a communication network and determining whether to solicit updated advertising content in response to such determined bandwidth availability. In such a scenario, advertising content may be updated during periods of lower-than-normal bandwidth utilization in a communication network over which updated advertising content may be communicated. In such a scenario, periods of relatively higher-than-normal bandwidth demands can be reserved for the communication of real-time programming and/or the communication of real-time original or updated advertising content.

Other system conditions that may be determined (e.g., which may include direct measurement and/or receiving messages indicative of such determination from another entity) may, for example, comprise whether user equipment implementing the method 100 is currently being utilized, communication network reliability, communication network availability, communication network cost, etc.

Note that such system conditions may also be incorporated into a profile, which as will be discussed below, can be utilized to control updating advertising content based on date, day-of-week, time-of-day, etc. For example, historical network bandwidth utilization may be utilized to develop a day-based or time-based operating profile. For example, in a scenario in which it is known that weekday early morning hours (e.g., a 2:00-4:00 am window) and all weekend hours are historically windows during which a relatively large amount of communication bandwidth is available, step 110 may comprise determining to solicit updated advertising information only (or generally) during such day/time windows.

Step 110 may, for example, comprise determining to solicit updated advertising content as a function of time and/or date. For example, step 110 may comprise determining to solicit updated advertising content periodically (e.g., with a constant or substantially constant period). In an exemplary scenario, step 110 may comprise determining to solicit updated advertising content for recorded programming once weekly in early morning hours.

Also for example, step 110 may comprise determining to solicit updated advertising content for recorded programming in response to a user input command. Such a user input command may, for example, comprise an explicit command to update advertising content for a recorded program, for a plurality of recorded programs, for all recorded programs, etc. Such a user input command may also, for example, comprise a command to play back a recorded program. In an exemplary scenario, a user command to play back a recorded program may trigger step 110 to immediately solicit updated advertising for the recorded program.

Step 110 may comprise determining to solicit updated advertising content for a recorded program before, during and/or after playback of the recorded program. For example, after a program has been recorded, and as discussed above, step 110 may comprise soliciting updated advertising content for the recorded program (e.g., responsive to system conditions, responsive to time and/or date, responsive to user command, etc.) prior to playback of the recorded program, while the recorded program is being played back, and after the recorded program is played back (e.g., for presenting updated advertising immediately after playback of the recorded program, in preparation for a next playback of the recorded program, etc.).

For example, during playback of a recorded program, step 110 may comprise determining to solicit updated advertising content in response to encountering advertising content (or associated data) embedded in the recorded program. Such operation may, for example, apply to all advertising content (or associated data) encountered during program playback or only to advertising content that is marked as time-sensitive. In an exemplary scenario, step 110 may comprise looking ahead of the current played back location in the recorded program to detect the presence of embedded advertising content (or associated data). In such a scenario, step 110 may comprise detecting the presence of such advertising content far enough in advance to solicit and receive updated advertising content before playback of the recorded program reaches the point at which the advertising content is to be presented. Such look-ahead operation may, for example, overcome server and/or network latency (i.e., the lag time between requesting and receiving updated advertising content) associated with the acquisition of updated advertising content from the source of such content. Such look-ahead operation would, for example, help ensure that the most recently updated advertising content is presented with the recorded program.

Step 110 may comprise determining to solicit updated advertising content on a program-by-program basis. Step 100 may also, for example, comprise determining to solicit updated advertising for all recorded programs, for all recorded programs for which updated advertising content operation is enabled, for one or more recorded programs that have yet to be played back once (or some other finite number of times), etc.

Note that the updated advertising content need not be limited to updated versions of the specific advertising originally broadcast with a recorded program. For example, updated advertising content for a recorded program may correspond to different goods, services and/or commercial enterprises associated with the advertising content originally associated (or later associated) with the recorded program.

Also for example, updated advertising content may be directed to a particular user, household, user equipment, etc. For example, step 110 may comprise determining to solicit updated advertising content for a particular target audience (e.g., user, user group, geographical area, etc.).

In general, step 110 may comprise determining to solicit updated advertising for a recorded program. Accordingly, the scope of various aspects of the present invention should not be limited by characteristics of any particular manner of performing such determining unless explicitly claimed.

Turning next to step 120, such step may comprise establishing a communication link (e.g., over which solicitations for updated advertising content may be communicated). Non-limiting examples of such a communication link will now be provided. Note that the establishment of such a communication link may be in response to the determination made at step 110, but need not be. For example, step 120 may comprise establishing a communication link independent of the determination being made at step 110 to solicit updated advertising content. For example, step 120 may comprise establishing a communication link prior to the determination being made at step 110 to solicit updated advertising content.

The communication link (or plurality of communication links) established at step 120 may comprise characteristics of any of a variety of different types of communication links (e.g., connectionless and/or connection-oriented links). For example, step 120 may comprise establishing an end-to-end communication link (or channel) with a video content provider. Such communication link may, for example, be a guaranteed-bandwidth link (e.g., an individually allocated time-slot, frequency and/or code). Step 120 may, for example, comprise establishing a communication link that extends from user equipment implementing the method 100 to a content provider that provides updated advertising content.

Such communication link may, for example, comprise a general communication link with a communication network (e.g., a television network, the Internet, etc.). In such a scenario, step 120 may comprise opening a general communication channel with a communication network access provider (or access point). In such a scenario, requests for updated advertising content may be formed into addressed data packets that are routed through such network to the destination (e.g., to a destination content provider).

Step 120 may comprise establishing a communication link (or plurality thereof) over or with a variety of different types of communication networks (e.g., a cable and/or satellite television network, a telecommunication network, a cellular telecommunication network, a local area network (LAN), metropolitan area network (MAN), personal area network (PAN), wide area network (WAN), home network, campus network, enterprise network, etc.).

In general, step 120 may comprise establishing a communication link (e.g., with a communication network, with a particular content provider, etc.). Accordingly, the scope of various aspects of the present invention should not be limited by characteristics of any particular manner of establishing such a communication link or of any particular type of communication link unless explicitly claimed).

Turning next to step 130, such step may comprise soliciting updated advertising content. Step 130 may comprise performing such soliciting in any of a variety of manners, non-limiting examples of which will now be provided.

For example, step 130 may comprise forming and transmitting one or more messages to one or more content sources (e.g., programming and/or advertising content sources) over the communication link(s) established at step 120.

In an exemplary scenario, for example in which user equipment implementing the method 100 only receive video content from a single networked source, step 130 may comprise forming a message soliciting updated advertising and communicating such message to the single source.

In another exemplary scenario, step 130 may comprise identifying one or more potential sources for updated advertising content. Such identifying may, for example, comprise reading such identification information from data stored with the recorded program (e.g., in an advertisement-related data structure stored with the recorded program data) or stored separate from the recorded program (e.g., in a database listing sources of advertising content for a particular program, sources of advertising for all programs, etc.).

Step 130 may, for example, comprise soliciting updated advertising content from a plurality of separate advertising content sources (e.g., television networks, advertising agencies, commercial enterprises advertising their own goods and/or services, a central database of advertising content for a group of advertisers, etc.). In an exemplary scenario, step 130 may comprise communicating a first request for updated advertising content from an original source of the recorded program, and communicating a second request for updated advertising content from a central database that stores updated advertising content for a plurality of advertisers. Additionally, step 130 may comprise soliciting updated advertising via a plurality of different communication networks (e.g., via a cable television network, via the Internet, etc.).

As mentioned previously, step 130 may comprise forming and communicating a message requesting updated advertising content for a recorded program. Such a message may comprise any of a variety of different types of information, non-limiting examples of which will now be provided.

For example, in an exemplary scenario, step 130 may comprise forming a request for all updated advertising content that is associated with a recorded program. Step 130 may, for example, comprise forming a message having a field that identifies the particular recorded program. In such a scenario, step 130 may comprise determining a date associated with the recorded program (e.g., a date at which the program was broadcast) and/or a date associated with the most recent advertising update associated with the recorded program. Step 130 may, for example, comprise forming the message with a field that identifies the original broadcast date/time for the recorded program and/or the date/time of the most recent advertising update for the recorded program. In such a scenario, a content provider receiving a message comprising such information may determine whether updated advertising content exists for the recorded program (e.g., advertising content that has been updated since the original broadcast of the recorded program or advertising content that has been updated since the most recently provided update. Similarly, the message may comprise information identifying respective version numbers associated with advertisements, such that a content source may determine whether a newer version exists.

In another exemplary scenario, step 130 may comprise forming a request for updated advertising content, where such request comprises information identifying the user, user account, household, user equipment, etc. In such a scenario, updated advertising content may be tailored to a particular target audience.

Step 130 may comprise operating in accordance with a communication protocol that comprises characteristics specifically tailored to the solicitation and/or communication of advertising content. For example, as mentioned previously, message structure may comprise dedicated fields that identify the advertising content for which an update is desired, specific programs for which updated advertising content is desired, particular users for which advertising content is desired, time/date information, version information, etc. Also for example, the communication protocol may define a message exchange sequence that is specifically tailored to the solicitation and/or communication of advertising content. Such message exchange sequence may, for example, comprise messages specifically adapted to request updated advertising content and/or messages specifically adapted to respond to requests for updated advertising content (e.g., messages stating that no updates exist, messages stating that updates will be forthcoming and/or describing the nature of such updates, data stream definitions for updated advertising content, etc.).

In general, step 130 may comprise soliciting updated advertising content. Accordingly, the scope of various aspects of the present invention should not be limited by characteristics of any particular manner of performing such soliciting unless explicitly claimed.

Turning next to step 195, such step generally comprises performing additional operations related to updating advertising for a recorded program. Various non-limiting examples of such additional operations will now be provided.

Step 195 may, for example, comprise receiving and storing updated advertising content. For example, step 195 may comprise storing advertising content in on-board and/or off-board memory of user equipment implementing the exemplary method 100. For example, step 195 may comprise overwriting advertising content embedded in a recorded program with updated advertising content. In such a scenario, unless the updated advertising content is of the exact length of outdated advertising content being replaced, data structures (e.g., comprising memory pointers) may be utilized to maintain continuity between the updated advertising and the recorded program. For example, in a scenario in which updated advertising content is shorter than corresponding advertising being replaced, the updated advertising content may be stored in place of a portion of the replaced advertising content and a marker may indicate the end of the updated advertising content. Such a marker may, in an exemplary implementation, comprise a pointer to next video content to be presented (e.g., next advertising content, the next portion of the recorded program. etc.).

In another scenario in which updated advertising content is longer than corresponding advertising content being replaced, step 195 may comprise storing updated advertising content in a different memory location than the advertising content being replaced. In such a scenario, step 195 may comprise inserting data in the recorded program (or in a table external to the recorded program) to direct the user equipment to play the updated advertising content at the appropriate time (e.g., during a commercial break in the recorded programming). The updated advertising content (or table) may then comprise data (e.g., a pointer) directing play to the next video content to be presented (e.g., next advertising content, the next portion of the recorded program. etc.). Note that for memory efficiency, step 195 may (e.g., in a scenario in which updated advertising content requires more memory than the content being replaced) comprise storing the updated advertising content in a combination of memory spaces, for example a first space that was used to store the replaced content and a second space for the remaining updated content as needed.

In general, in a scenario in which updated advertising content is stored in addition to advertising content being replaced, step 195 may comprise maintaining a memory map (e.g., a table) that tracks advertising content that is associated with a particular recorded program. Such tracking may, for example, be advantageous in avoiding memory leaks with erasing a recorded program from storage. In other words, when erasing a recorded program from storage, the memory space corresponding to the recorded program is generally freed for the recording of other content. In a scenario in which updated advertising content is stored in memory space separate from the recorded program, and in which the need for such updated advertising content disappears with erasing the recorded program, the memory space utilized to store the updated advertising content may be similarly freed for the recording of other content.

Though the above discussion generally mentions recording updated advertising content along with recorded programming, such recording of updated advertising content is not necessary. For example, updated advertising content may be received and presented to a user in real-time (e.g., during commercial breaks in recorded programming being played back). Also for example, updated advertising content may be buffered in memory (on a temporary basis relative to long-term storage) and removed from the buffer memory as it is presented (or when viewing the recorded program is halted for at least a threshold amount of time).

For example, in such a scenario, updated advertising content may be solicited for a recorded program that is being played back, where as discussed above, such solicitation may be performed with enough lead time to ensure that the updated advertising content will be received in time for the anticipated (e.g., scheduled) presentation of such updated advertising content. In such a scenario, when the updated advertising content has been presented (and, for example, a determination is made that the updated advertising content is not to be presented again for the remainder of the recorded program playback), the memory space for the updated advertising content may be freed. In such a scenario, storage of updated advertising content may be performed in a memory device (e.g., a solid state memory device) that is separate from the memory device in which the recorded program is stored (e.g., a hard drive). Alternatively for example, the recorded program and updated advertising content may be stored on the same memory device.

As discussed above, step 195 may comprise maintaining a table or other data structure that includes memory pointers to recorded program content and recorded advertising content. Such a table (or data structure) may then be utilized by user equipment playing back the recorded programming to identify commercial breaks, locate updated advertising content in memory, play the updated advertising content, and then return to the recorded programming (or additional advertising content) after presenting the updated advertising content. Such a table (or data structure) may, for example, comprise a master table that includes memory mapping information for all recorded programs (and associated advertising content) or program-specific tables. Such program-specific tables (or data structures) may, for example, be included in metadata for a program, in a header for a program file or data stream, in memory space that is completely separate from recorded program space, embedded in a program file and/or data stream, etc.

Any of a variety of different types of information may be included in such tables (or data structures). For example, at locations in recorded program data corresponding to commercial breaks, data records may be inserted that comprise information identifying name and/or location of specific advertising content to be presented, information identifying the goods and/or services being advertised (or general types thereof), information of geographical location (e.g., of the advertiser, user, user equipment, etc.), and information identifying the provider of the recorded program (e.g., network, studio, etc.), Also for example, such tables and/or data structures may comprise information identifying a communication network provider (e.g., cable company, satellite television company, Internet service provider, etc.), information identifying a communication network access point, network addressing information (e.g. URL information associated with a content server (e.g., advertising content server, television program server, general video content server, etc.)), timing information (e.g., point in a program at which an advertisement is to be played, duration or duration window for an advertisement, time limit for an inserted advertisement, total time to allocate for advertisements in a program or for particular commercial breaks, etc.), time and/or date information (e.g., time and/or date at which the recorded program was broadcast and/or recorded, time and/or date associated with the advertising content, expiration date associated with particular advertising content, etc.).

As mentioned previously, step 130 may comprise soliciting updated advertising content in advance of the need for such content (e.g., to make up for content server and/or network latency). In such a scenario, the recorded program data may comprise markers (e.g., comprising data indicative of an up-coming commercial break, the above-mentioned data structures, etc.) positioned in advance of the actual location of the corresponding commercial break.

Step 195 may also, for example, comprise directing execution flow of the exemplary method 100. For example, step 195 may comprise returning execution flow of the exemplary method 100 to any of the previous steps (e.g., for additional advertising content updating). Also for example, step 195 may comprise performing any other operations discussed herein (e.g., with regard to any of the steps of the exemplary method 200 illustrated in FIG. 2 and discussed below). Further for example, step 195 may comprise presenting recorded programming with updated advertising content to the user (e.g., on a television screen, on a personal computer screen, on a screen in parallel to a television screen, etc.). Such presentation may, for example, be performed on a video display housed with user equipment implementing the method 100, or may be performed by communicating programming and/or advertising information to another device for display.

In general, step 195 may comprise performing continued processing. Accordingly, the scope of various aspects of the present invention should not be limited by characteristics of any particular type of continued processing unless explicitly claimed.

The previous discussion generally concerned the solicitation of updated advertising content. For example, in an exemplary scenario, user equipment implementing the method 100 may (e.g., at step 130) solicit updated advertising content from one or more providers of such content. Alternatively, or in addition to such solicitation-based advertising updating, updated advertising may be received and managed in an unsolicited manner. The discussion of FIG. 2 below will provide various non-limiting examples of such unsolicited advertising content updating.

Figure 2:
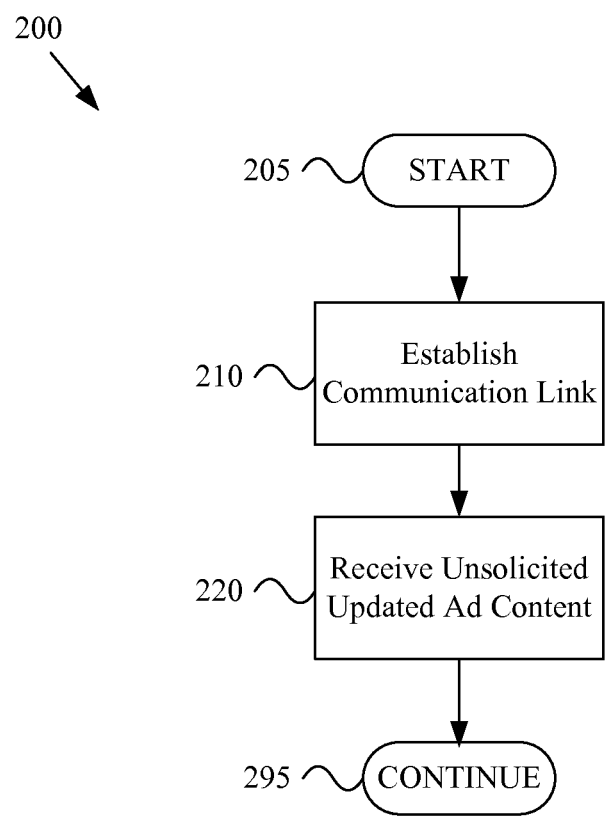
FIG. 2 shows a non-limiting exemplary flow diagram of a method for updating advertising content for a recorded program, in accordance with various aspects of the present invention.

Turning now to FIG. 2, such figure shows a non-limiting exemplary flow diagram of a method 200 for updating advertising content for a recorded program, in accordance with various aspects of the present invention. The exemplary method 200 may, for example, share any or all characteristics with the exemplary method 100 illustrated in FIG. 1 and discussed previously. Any or all aspects of the exemplary method 200 may, for example, be implemented in user equipment with video content recording capability (e.g., a personal video recorder, a television receiver (or set top box) with video recording capability, a gaming device with video recording capability, a personal computing device (e.g., handheld, notebook, laptop, desktop, etc.) with video recording capability, etc.

The exemplary method 200 may begin executing at step 205. Step 205 may share any or all characteristics with step 105 of the exemplary method 100 illustrated in FIG. 1 and discussed previously. Also for example, step 205 (or, for example, step 220) may begin executing at step 195 of the exemplary method 100 illustrated in FIG. 1.

The exemplary method 200 may, at step 210, comprise establishing a communication link. Step 210 may share any or all characteristics with step 120 of the exemplary method 100 illustrated in FIG. 1 and discussed previously. For example and without limitation, step 210 may comprise establishing one or more communication links with network providers and/or content providers (e.g., programming content providers, advertising content providers, etc.). Also for example, such communication link(s) may be connectionless communication links and/or connection-oriented communication links.

The exemplary method 200 may, at step 220, comprise receiving unsolicited updated advertising content (e.g., via the communication link(s) established at step 210). Non-limiting examples of such receiving will now be presented.

Unsolicited updated advertising content may be received from a content provider (e.g., a programming provider, an independent advertising content provider, an enterprise advertising its own goods and/or services, etc.), where such advertising content is broadcast, multicast and/or unicast from the content provider. For example, a content provider may broadcast (e.g., over one or more dedicated advertising content channels) updated advertising content, where such content is available to any system (e.g., user equipment) receiving such broadcast.

Also for example, a content provider may multicast updated advertising content to a group of recipients (e.g., to a group of user equipment) that are known to have content recorded (e.g., programming content and/or advertising content) related to the updated advertising content. In various exemplary scenarios, a content provider may know the identity of programming that is stored (e.g., at user equipment). For example, in an exemplary scenario, user equipment may notify (e.g., periodically and/or when a program is recorded or deleted) one or more content providers of the identity of recorded programs (or associated advertising). In another scenario, the content provider (or other enterprise) may monitor the recording of television programming as it occurs (e.g., user equipment may send a signal to such content provider indicating when a program is being recorded and/or deleted).

In such scenarios, the content provider(s) may know the addresses of recipients in need of particular updated advertising content. In such scenarios, the content provider(s) may communicate the particular updated advertising content to a group of recipients (e.g., a multicast group, a list of individual recipients, etc.) that are determined to be in need of such updated advertising content.

In another exemplary scenario, for example in which user equipment has a store of advertising content that will be presented to a user during commercial breaks in recorded programming, the content provider may communicate updated advertising content that is targeted to particular users (or user groups). For example, in a scenario in which it is determined that a group of users are interested in commercials for particular goods and/or services, the content provider may target advertising content, including advertising content updates, to such group. In such a scenario, when advertising content that has been sent to such group is updated, the content provider may push such updated advertising content down to members of the group (e.g., in a communication to a multicast group, in a communication to a set of individual recipients, etc.).

As mentioned above, updated advertising may also be unicast to particular users. In an exemplary scenario, a content provider may comprise a database that correlates user (or user equipment) identification to particular advertising content. In such a scenario, the content provider may push updated advertising content to particular identified users (or user equipment) when such updated advertising content becomes available to the content provider.

Note, unsolicited updated advertising content may be associated with particular respective programming, but need not be. For example and without limitation, updated advertising content may be targeted to recipients regardless of the type of recorded programming.

In general, step 220 comprises receiving unsolicited updated advertising content (e.g., via the communication link(s) established at step 210). Accordingly, the scope of various aspects of the present invention should not be limited by characteristics of any particular manner of receiving unsolicited updated advertising content unless explicitly claimed.

Turning next to step 295, such step generally comprises performing additional operations related to updating advertising content for a recorded program (e.g., unsolicited updated advertising content received at step 220). Various non-limiting examples of such additional operations will now be provided. Step 295 may share any or all characteristics with step 195 of the exemplary method 100 illustrated in FIG. 1 and discussed previously.

Step 295 may, for example, comprise directing execution flow of the exemplary method 200. For example, step 295 may comprise returning execution flow of the exemplary method 200 to any of the previous steps (e.g., for additional advertising content updating). Also for example, step 295 may comprise performing any other operations discussed herein (e.g., with regard to any of the steps of the exemplary method 100 illustrated in FIG. 1 and discussed below). Further for example, step 295 may comprise presenting recorded programming with updated advertising content to the user (e.g., on a television screen, on a personal computer screen, on a screen in parallel to a television screen, etc.). Such presentation may, for example, be performed on a video display housed with the user equipment implementing the method 200, or may be performed by communicating programming and/or advertising information to another device for display.

Figure 3:
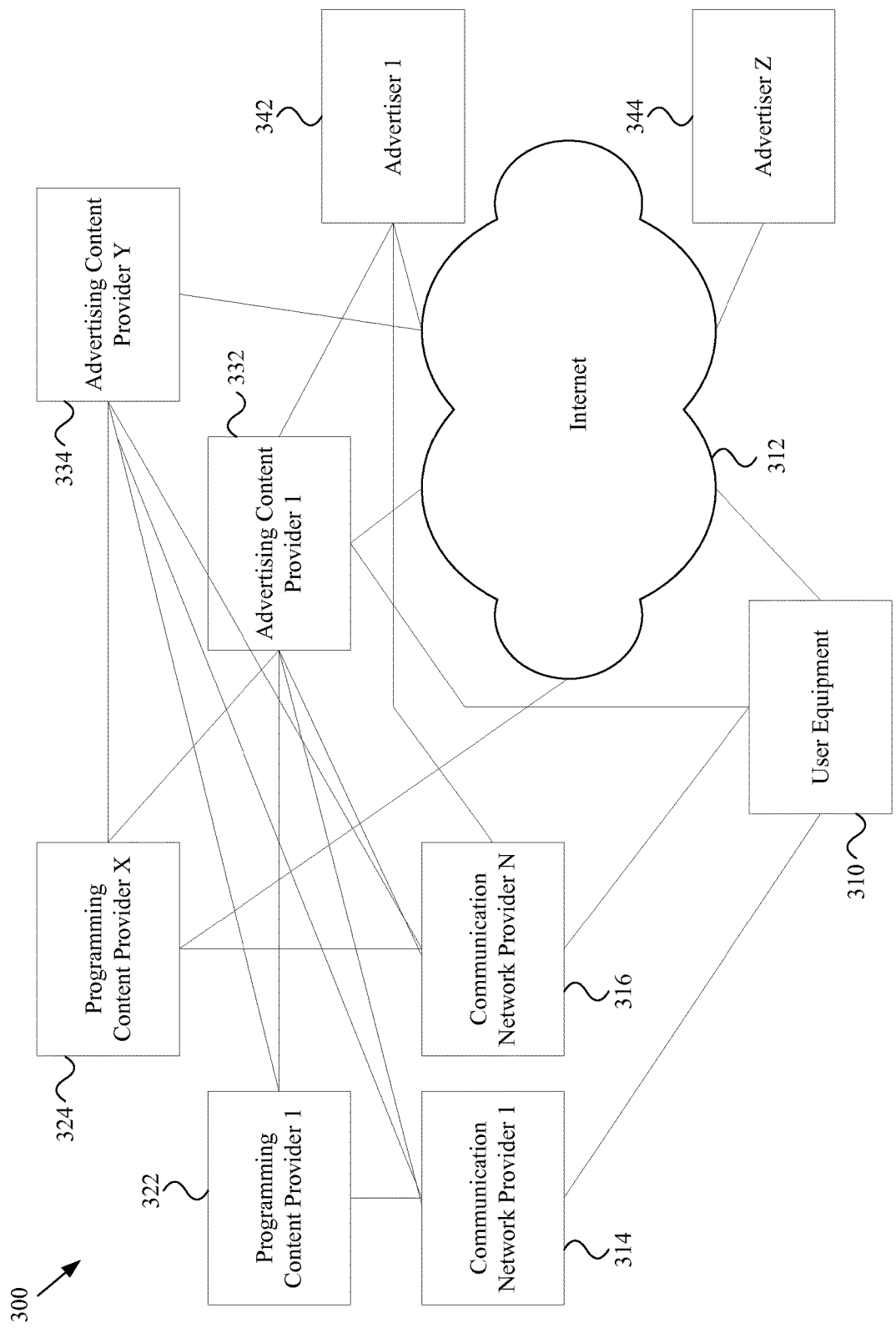
FIG. 3 is a diagram illustrating an exemplary video content distribution environment.

FIG. 3 is a diagram illustrating a video content (e.g., programming and/or advertising video content) distribution environment 300. The exemplary environment 300 comprises user equipment 310 (e.g., an end-user electronic device with video content recording and playback capability).

Figure 4:
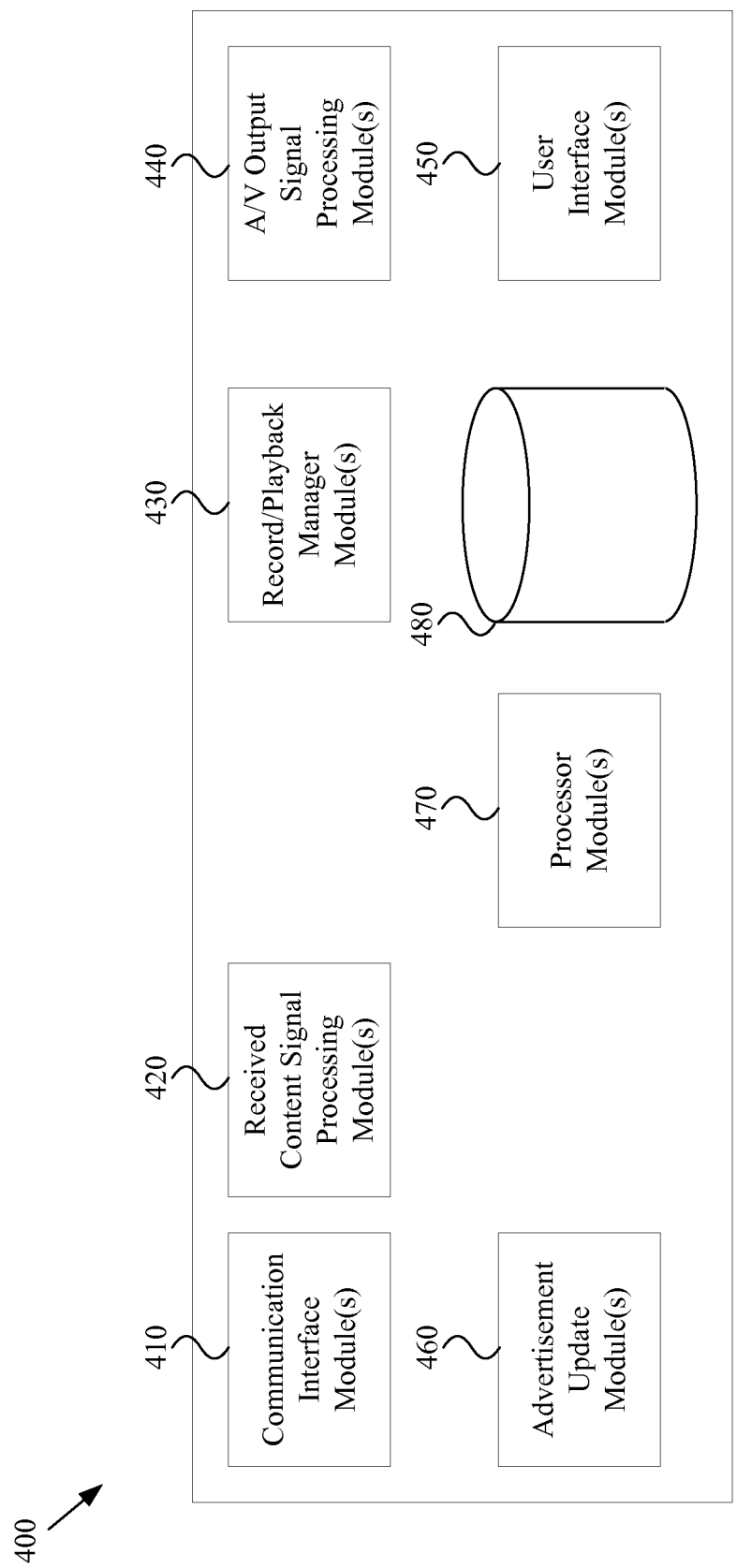
FIG. 4 is a diagram illustrating various non-limiting aspects of exemplary user equipment, in accordance with various aspects of the present invention.

Such user equipment 310 may share any or all characteristics with the user equipment discussed elsewhere herein, including without limitation the user equipment 400 illustrated in FIG. 4. The user equipment 310 may, for example, perform any or all of the functionality discussed previously with regard to the methods 100 and 200 illustrated in FIGS. 1-2 and discussed previously.

The exemplary environment 300 also comprises a plurality of communication networks (or communication network providers). For example, the user equipment is communicatively coupled to a first communication network provider 314 and an $N^{th}$ communication network provider 316. Such communication network providers (314 and 316) may operate to communicatively couple the user equipment 310 to any of a variety of different types of communication networks. For example, such communication network providers (314 and 316) may operate to provide the user equipment 310 access to cable and/or satellite television networks, wired and/or wireless telecommunication networks, wired and/or wireless data networks, wireless networks of various ranges (e.g., PANs, LANs, WANs, MANs, etc.), etc.

The exemplary environment 300 also comprises the Internet 312 (or Internet Service Provider). For example, the user equipment 310 may be communicatively coupled directly to the Internet 312 or via an Internet Service Provider. Note that the user equipment 310 may also, for example, be communicatively coupled to the Internet 312 via the first communication network provider 314 and/or $N^{th}$ communication network provider 316.

The exemplary environment 300 also comprises a plurality of programming content providers (e.g., 1 to X programming providers). For example, the illustrated environment 300 shows a first programming content provider 322 and an $X^{th}$ programming content provider 324. Such programming content providers (322 and 324) may operate to provide programming content (or any video content, including advertising content and/or updated advertising content) to the user equipment 310 via any of the communication networks (or providers) discussed above. A programming provider may, for example, include a television programming provider, a computer network programming provider, a television network or portion thereof (e.g., Fox, NBC, CBS, ABC, ESPN, NFL, HGTV, etc.), etc.

In an exemplary scenario, the first programming content provider 314 may operate to communicate a first television program to the user equipment 310 via the first communication network provider 314. Such a first television program may, for example, comprise embedded first advertising video content that the first programming content provider 314 received from the first advertising content provider 332 and embedded into the first program. Such a first television program may also, for example, comprise information relating the television program to particular advertising content that is not embedded in the television program.

In another exemplary scenario, the $X^{th}$ programming content provider 314 may operate to communicate a second television program to the user equipment 310 via the $N^{th}$ communication network provider 316 and/or via the Internet 312. Such second television program may, for example, alternatively contain no advertising content or contain advertising content received from any or all of the advertising content providers (332 or 334) or advertisers (342 or 344) in the environment 300 or external to the illustrated environment 300.

As mentioned previously (e.g., in the discussion of step 240), the user equipment 310 may interact with video content providers (e.g., programming content providers, advertising content providers, advertisers, communication service providers, etc.) to, at least in part, obtain updated advertising content. In such an exemplary scenario, the user equipment 310 operates to communicate with any or all of the communication network providers (314 and 316), the programming content providers (322 and 324), the advertising content providers (332 and 334), and the advertisers (342 and 344).

As mentioned above, advertising video content may be embedded in programming video content. Also for example, as illustrated by various communication pathways in the environment 300, the user equipment 310 may operate to receive advertising content directly from the advertising content providers or advertisers (e.g., advertising enterprises).

As referred to above, the exemplary environment 300 also, for example, comprises a plurality of advertising content providers (e.g., 1 to Y advertising content providers). For example, the illustrated environment 300 shows a first advertising content provider 332 and a $Y^{th}$ advertising content provider 334. Such advertising content providers (332 and 334) may operate to provide advertising video content (e.g., initial advertising content and/or updated advertising content) to the user equipment 310 via any of the communication networks (or providers) discussed above. Also for example, such advertising providers (332 and 334)

may operate to provide advertising video content to the programming content providers (322 and 324) for ultimate communication to the user equipment 310 (e.g., embedded in a television program, communicated in a data stream independent of data streams communicating television programming, etc.).

Also, as mentioned above, the exemplary environment 300 also comprises a plurality of advertisers (e.g., 1 to Z advertisers). For example, the illustrated environment 300 shows a first advertiser 342 (e.g., a first commercial enterprise advertising a product or service provided by such first commercial enterprise) and a $Z^{th}$ advertiser 344 (e.g., a $Z^{th}$ commercial enterprise advertising a product or service provided by such $Z^{th}$ commercial enterprise). As illustrated in FIG. 3, such advertisers (342 and 344) may operate to communicate advertising content (or related information), including original and/or updated advertising content, to enterprises that specialize in generating video advertising content (e.g., advertising content providers 332 and 334), communicate advertising content (or related information) to programming content providers (e.g., the programming content providers 322 and 324), communicate advertising content (or related information) to communication network providers (or networks) (e.g., the communication network providers 314 and 316, the Internet 312 (or ISP), etc.), and/or communicate advertising content (or related information) directly to the user equipment 310).

In general, the exemplary environment 300 provides a non-limiting illustration of various entities that might or might not be present in any particular video content distribution system. Accordingly, the scope of various aspects of the present invention should not be limited by characteristics of the exemplary environment 300 unless explicitly claimed.

FIG. 4 is a diagram illustrating various non-limiting aspects of exemplary user equipment 400. The user equipment may comprise characteristics of any of a variety of types of user equipment. For example and without limitation, the user equipment 400 may be or comprise an electronic device with video recording and playback capability. For example, the user equipment 400 may comprise a personal video recorder, a television receiver (or set top box, for example cable and/or satellite) with video recording capability, a gaming device with video recording capability, a television with video recording capability, a personal computing device (e.g., handheld, notebook, laptop, desktop, etc.) with video recording capability, a distributed home network comprising communicatively coupled devices that operate to record and/or playback video content, etc. Such user equipment 400 may, for example, be integrated into a single housing or a plurality of housings of a personal audio/video entertainment system. In a configuration comprising a plurality of housings, such user equipment may be co-located or positioned at geographically distinct locations.

The user equipment 400 may, for example, share any or all characteristics with the user equipment 310 of the environment 300 illustrated in FIG. 3 and discussed previously. Also for example, the user equipment 400 (e.g., one or more modules thereof) may, for example, operate to perform any or all functionality discussed previously with regard to the methods 100 and 200 illustrated in FIGS. 1-2 and discussed previously.

The user equipment 400 may, for example, comprise one or more communication interface modules 410 that operate to perform any or all of the communication interface functionality discussed herein. The communication interface module(s) 410 may, for example, operate to communicate over any of a variety of communication media and utilizing any of a variety of communication protocols (e.g., including operating in accordance with various respective protocol layers, for example, PHY, MAC, network, transport, etc.). For example, the communication interface module 410 may be operable to communicate via one or more wired and/or wireless communication ports. The communication interface module(s) 410 may, for example, operate to communicate with one or more communication networks (e.g., cable television networks, satellite television networks, telecommunication networks, the Internet, local area networks, personal area networks, metropolitan area networks, etc.) via which video content (e.g., television program content, advertising video content, etc.) and/or other data (e.g., information regarding the manner in which advertising video content is to be displayed, user information, account information, general data, etc.) is communicated. Also for example, the communication interface module(s) 410 may operate to communicate with local sources of video content (e.g., video recorders, receivers, gaming devices, etc.) that may, for example, be external to but communicatively coupled to the user equipment 400. Additionally, for example, the communication interface module(s) 410 may operate to communicate with a controller for the user equipment (e.g., directly or via one or more intermediate communication networks).

The exemplary user equipment 400 may also comprise additional communication interface modules, which are not illustrated. Such additional communication interface modules may, for example, share any or all aspects with the communication interface module(s) 410 discussed above.

The exemplary user equipment 400 may comprise one or more signal processing modules 420. Such signal processing module(s) 420 may, for example, operate to process received video and/or data content (e.g., programming and/or advertising content, user interface content received via a communication network etc.). Such signal processing modules may, for example and without limitation, comprise video decoding modules, transcoding modules that convert coded content from one code to another, audio processing modules, etc.

The exemplary user equipment 400 may comprise one or more video record/playback manager modules 430. Such module(s) 430 may operate to manage the recording and playback of video content (e.g., program content, advertising content, etc.). Such module(s) 430 may operate to perform any or all of the video recording and/or playback functionality discussed herein.

Such module(s) 430 may, for example, operate to utilize the user interface module(s) 450 to interact with a user regarding desired recording and playback operation. Such module(s) may, for example, operate to interact with the memory 480 (or with an external memory) for recording video content and/or reading recorded video content. Such module(s) 430 may, for example, operate to interact with the advertisement update module(s) 460 which manages updating advertising content to be present to a user (e.g., to be presented with program content). Such module(s) 430 may also, for example, operate to utilize the A/V output signal processing module(s) 440 to process output video content for ultimate presentation to a user.

As mentioned above, the exemplary user equipment 400 may also comprise one or more audio/video output signal processing modules 440. Such A/V output processing module(s) 440 may, for example, operate to process audio and/or video information for output to a display and/or speaker device. For example, such A/V output processing module(s) 440 may operate to receive stored video content information from the memory 480 and process such information (e.g., performing decoding, performing decompressing, converting video data into video display driver signals, etc.) for output to a user. For example, the A/V output processing module(s) 440 may operate to output audio speaker and/or video display driver signals. Also for example, the A/V output processing module(s) 440 may operate to output processed audio and/or video data for further downstream processing (e.g., for ultimate presentation to a user in human-perceivable form).

The exemplary user equipment 400 may also comprise one or more user interface modules 450. The user interface module(s) 450 may generally operate to provide user interface functionality to a user of the user equipment 400. The user interface module(s) 450 may, for example, operate to perform any or all of the user interface functionality discussed herein.

For example, and without limitation, the user interface module(s) 450 may operate to provide for user control of any or all standard user equipment commands (e.g., video recording and/or playback control, for example, record commands, playback commands scheduled recording commands, channel control, on/off control, video input and/or output selection, programming interaction, interacting with the user regarding the presentation and/or updating of advertising video content before, during and/or after the presentation of the recorded program video content.

The user interface module(s) 450 may, for example, operate to respond to user commands utilizing user interface features disposed on the user equipment 400 (e.g., buttons, etc.) and may also utilize the communication module(s) 410 to communicate with a controller (e.g., a dedicated user equipment remote control, a universal remote control, a cellular telephone, personal computing device, gaming controller, etc.). Further for example, the user interface module(s) 450 may utilize the communication module(s) 410 to communicate with another device external to the user equipment 400 to utilize the user interface features of such external device.

The exemplary user equipment 400 may comprise one or more processors 470. The processor(s) 470 may, for example, comprise a general purpose processor, digital signal processor, application-specific processor, microcontroller, microprocessor, etc. For example, the processor(s) 470 may operate in accordance with software (or firmware) instructions. As mentioned previously, in addition to or in lieu of any or all functionality discussed herein being performed by discrete hardware (e.g., in distinct separate integrated circuits or combined into a single integrated circuit), any or all functionality discussed herein may be performed by a processor executing instructions. For example, though various modules are illustrated as separate blocks or modules in FIG. 4, such illustrative modules, or any portion thereof, may be implemented by the processor(s) 470.

The exemplary user equipment 400 may comprise one or more memories 480. As discussed above, any or all functional aspects discussed herein may be performed by one or more processors executing instructions. Such instructions may, for example, be stored in the one or more memories 480. Such memory 480 may, for example, comprise characteristics of any of a variety of types of memory. For example and without limitation, such memory 480 may comprise one or more memory chips (e.g., ROM, RAM, EPROM, EEPROM, flash memory, one-time-programmable OTP memory, etc.), hard drive memory, CD memory, DVD memory, etc.

Additionally, as discussed previously, the record/playback monitor module(s) 430 may interact with the memory 480 to store video content in the memory 480 and/or retrieve stored video content from the memory 480. In such a scenario, the memory 480 may comprise separate memories or may be partitioned to accommodate stored video content and processor instructions, along with user data and any other type of data (e.g., user profile information, user account information, scratch pad data, etc.).

The exemplary user equipment 400 may also comprise one or more advertisement update modules 460. Such advertisement manager module(s) 460 may, for example, operate to perform any or all of the advertisement updating functionality discussed herein (e.g., soliciting updated advertising content, receiving solicited and/or unsolicited updated advertising content, managing storage and/or presentation of solicited and/or unsolicited updated advertising content, etc.

For example and without limitation, the advertisement update module(s) 460 may operate to perform any or all functionality with regard to step 130 of the exemplary method 100 illustrated in FIG. 1 and discussed previously. For example, the module(s) 460 may comprise operating to solicit updated advertising content. Various non-limiting examples of such operation will now be presented.

For example, the advertisement update module(s) 460 may operate to form and transmit one or more messages to one or more content sources (e.g., programming and/or advertising content sources) over the communication link(s) established utilizing the communication interface module(s) 410.

In an exemplary scenario, for example in which the user equipment 400 only receives video content from a single networked source, the advertisement update module(s) 460 may operate to form a message soliciting updated advertising and utilize the communication interface module(s) 410 to communicate such message to the single source.

In another exemplary scenario, the advertisement update module(s) 460 may operate to identify one or more potential sources for updated advertising content. Such identifying may, for example, comprise reading such identification information from data stored with the recorded program (e.g., in an advertisement-related data structure stored with the recorded program data) or stored separate from the recorded program (e.g., in a database listing sources of advertising content for a particular program, sources of advertising for all programs, etc.).

The advertisement update module(s) 460 may, for example, operate to solicit updated advertising from a plurality of separate advertising content sources (e.g., television networks, advertising agencies, commercial enterprises advertising their own goods and/or services, a central database of advertising content for a group of advertisers, etc.). In an exemplary scenario, the advertisement update module(s) 460 may operate to utilize the communication interface module(s) 410 to communicate a first request for updated advertising content from an original source of the recorded program, and communicate a second request for updated advertising content from a central database that stores updated advertising content for a plurality of advertisers. Additionally, the advertisement update module(s) 460 may operate to utilize the communication interface module(s) 410 to solicit updated advertising via a plurality of different communication networks (e.g., via a cable television network, via the Internet, etc.).

As mentioned previously, the advertisement update module(s) 460 may operate to form and communicate a message requesting updated advertising content for a recorded program. Such a message may comprise any of a variety of different types of information, non-limiting examples of which will now be provided.

For example, in an exemplary scenario, the advertisement update module(s) 460 may operate to form a request for all updated advertising content that is associated with a recorded program. The advertisement update module(s) 460 may, for example, operate to form a message having a field that identifies the particular recorded program. In such a scenario, the advertisement update module(s) 460 may operate to determine a date associated with the recorded program (e.g., a date at which the program was broadcast) and/or a date associated with the most recent advertising update associated with the recorded program. The advertisement update module(s) 460 may, for example, operate to form the message with a field that identifies the original broadcast date/time for the recorded program and/or the date/time of the most recent advertising update for the recorded program. In such a scenario, a content provider receiving a message comprising such information may determine whether updated advertising content exists for the recorded program (e.g., advertising content that has been updated since the original broadcast of the recorded program or advertising content that has been updated since the most recent requested update. Similarly, the message may comprise information identifying respective version numbers associated with advertisements, such that a content source may determine whether a newer version exists.

In another exemplary scenario, the advertisement update module(s) 460 may operate to form a request for updated advertising content, where such request comprises information identifying the user, user account, household, user equipment, etc. In such a scenario, updated advertising content may be tailored to a particular target audience.

The advertisement update module(s) 460 may, for example, operate in accordance with a communication protocol that comprises characteristics specifically tailored to the solicitation and/or communication of advertising content. For example, as mentioned previously, message structure may comprise dedicated fields that identify the advertising content for which an update is desired, specific programs for which updated advertising content is desired, particular users for which advertising content is desired, time/date information, version information, etc. Also for example, the communication protocol may define a message exchange sequence that is specifically tailored to the solicitation and/or communication of advertising content. Such message exchange sequence may, for example, comprise messages specifically adapted to request updated advertising content, messages specifically adapted to respond to requests for updated advertising content (e.g., messages stating that no updates exist, messages stating that updates will be forthcoming and/or describing the nature of such updates, data stream definitions for updated advertising content, etc.).

In general, the advertisement update module(s) 460 may operate to solicit updated advertising content, receive the solicited updated advertising content and/or manage such content. Accordingly, the scope of various aspects of the present invention should not be limited by characteristics of any particular manner of, or mechanism for, performing such soliciting unless explicitly claimed.

Also for example, the advertisement update module(s) 460 may operate to perform (or manage the utilization of other modules to perform) any or all functionality with regard to step 195 of the exemplary method 100 illustrated in FIG. 1 and discussed previously.

Additionally for example, the advertisement update module(s) 460 may operate to perform (or manage the utilization of other modules to perform) any or all functionality with regard to step 220 of the exemplary method 200 illustrated in FIG. 2 and discussed previously. For example, the advertisement update module(s) 460 may operate to receive (and/or process) unsolicited updated advertising content (e.g., via the communication link(s) established by the communication interface module(s) 410). Non-limiting examples of such receiving will now be presented.

Unsolicited updated advertising content may be received from a content provider via the communication interface module(s) 410 (e.g., from a programming provider, an independent advertising content provider, an enterprise advertising its own goods and/or services, etc.), where such advertising content is broadcast, multicast and/or unicast from the content provider. For example, a content provider may broadcast (e.g., over one or more dedicated advertising content channels) updated advertising content, where such content is available to any system (e.g., user equipment) receiving such broadcast.

Also for example, a content provider may multicast updated advertising content providers to a group of recipients (e.g., to a group of user equipment) that are known to have content recorded (e.g., programming content and/or advertising content) related to the updated advertising content. In various exemplary scenarios, a content provider may know the identity of programming that is stored (e.g., at user equipment). For example, in an exemplary scenario, the user equipment 400 (e.g., the advertisement update module(s) 460) may utilize the communication interface modules (410) to notify (e.g., periodically and/or when a program is recorded or deleted) one or more content providers of the identity of recorded programs (or associated advertising). In another scenario, the content provider (or other enterprise) may monitor the recording of television programming as it occurs (e.g., user equipment 400 (e.g., the advertisement update module(s) and/or record/playback manager module(s) 430) may utilize the communication interface module(s) 410 to send a signal to such content provider indicating when a program is being recorded).

In such scenarios, the content provider(s) may know the addresses of recipients in need of particular updated advertising content. In such scenarios, the content provider(s) may communicate the particular updated advertising to a group of recipients (e.g., a multicast group, a list of individual recipients, etc.) that are determined to be in need of such updated advertising content.

In another exemplary scenario, for example in which the user equipment 400 has a store of advertising content (e.g., stored in the memory 480) that will be presented to a user by the record/playback manager module(s) 430 during commercial breaks in recorded programming, the content provider may communicate updated advertising content that is targeted to particular users (or user groups). For example, in a scenario in which it is determined that a group of users are interested in commercials for particular goods and/or services, the content provider may target advertising content, including advertising content updates, to such group. In such a scenario, when advertising content that has been sent to such group is updated, the content provider may push such updated advertising content down to members of the group (e.g., in a communication to a multicast group, in a communication to a set of individual recipients, etc.).

As mentioned above, updated advertising may also be unicast to particular users. In an exemplary scenario, a content provider may comprise a database that correlates user (or user equipment) identification to particular advertising content. In such a scenario, the content provider may push updated advertising content to particular identified users (or user equipment) when such updated advertising content becomes available to the content provider.

Note, unsolicited updated advertising content may be associated with particular respective programming, but need not be. For example and without limitation, updated advertising content may be targeted to recipients regardless of the type of recorded programming.

In general, the advertisement update module(s) 460 may operate to receive (and/or process) unsolicited updated advertising content. Accordingly, the scope of various aspects of the present invention should not be limited by characteristics of any particular manner of receiving unsolicited updated advertising content unless explicitly claimed.

Also for example and without limitation, the advertisement update module(s) 460 may operate to perform any or all functionality with regard to step 295 of the exemplary method 200 illustrated in FIG. 2 and discussed previously. For example, the module(s) 460 may comprise operating to perform various continued functionality related to updated advertising content (e.g., receiving and/or managing unsolicited updated advertising content).

Figure 5:
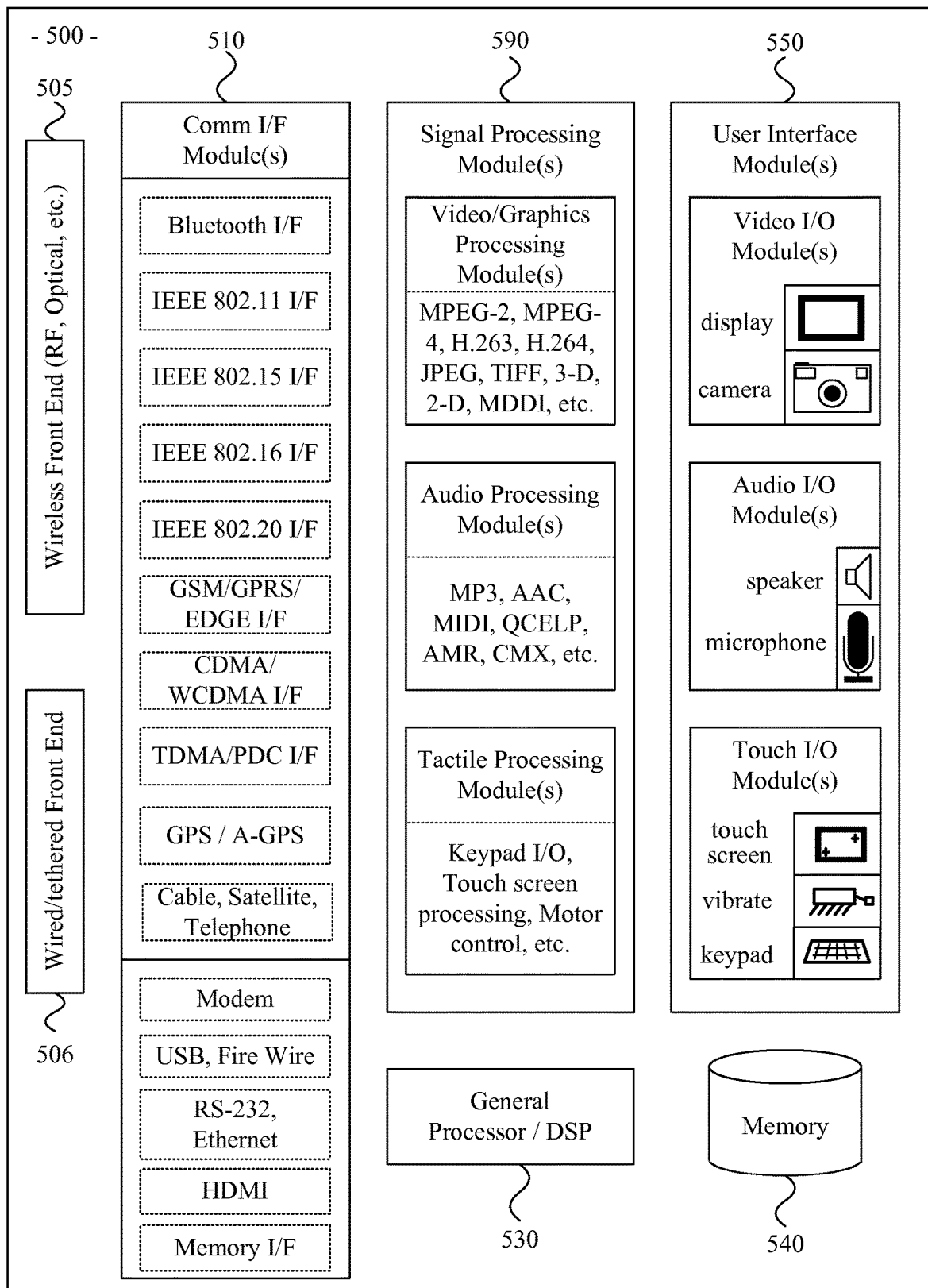
FIG. 5 is a diagram illustrating exemplary modules and/or sub-modules for user equipment, in accordance with various aspects of the present invention

Turning next to FIG. 5, such figure is a diagram illustrating exemplary modules and/or sub-modules for user equipment 500, in accordance with various aspects of the present invention. The exemplary user equipment 500 may share any or all aspects with any of the user equipment 310 and 400 discussed herein and illustrated in FIGS. 3 and 4. For example, the exemplary user equipment 500 (or various modules thereof) may operate to perform any or all functionality discussed herein with regard to the exemplary method 100 illustrated in FIG. 1 and/or the exemplary method 200 illustrated in FIG. 2. As with the exemplary user equipment 400, the components of the exemplary user equipment 500 may be disposed in a single user device (e.g., a personal video recorder, a television receiver with video recording capability, a gaming device with video recording capability, a personal computing device, etc.).

For example, the user equipment 500 comprises a processor 530. Such a processor 530 may, for example, share any or all characteristics with the processor(s) 470 discussed with regard to FIG. 4. Also for example, the user equipment 500 comprises a memory 540. Such memory 540 may, for example, share any or all characteristics with the memory 480 discussed with regard to FIG. 4.

Also for example, the user equipment 500 may comprise any of a variety of user interface module(s) 550. Such user interface module(s) 550 may, for example, share any or all characteristics with the user interface module(s) 450 discussed previously with regard to FIG. 4. For example and without limitation, the user interface module(s) 550 may comprise: a display device, a camera (for still or moving picture acquisition), a speaker, an earphone (e.g., wired or wireless), a microphone, a video screen (e.g., a touch screen), a vibrating mechanism, a keypad, and/or any of a variety of other user interface devices (e.g., a mouse, a trackball, a touch pad, touch screen, light pen, game controlling device, etc.).

The exemplary user equipment 500 may also, for example, comprise any of a variety of communication modules (505, 506, and 510). Such communication module(s) may, for example, share any or all characteristics with the communication interface module(s) 410 discussed previously with regard to FIG. 4. For example and without limitation, the communication interface module(s) 510 may comprise: a Bluetooth interface module; an IEEE 802.11, 802.15, 802.16 and/or 802.20 module; any of a variety of cellular telecommunication interface modules (e.g., GSM/GPRS/EDGE, CDMA/CDMA2000/1×-EV-DO, WCDMA/HSDPA/HSUPA, TDMA/PDC, WiMAX, etc.); any of a variety of position-related communication interface modules (e.g., GPS, A-GPS, etc.); any of a variety of wired/tethered communication interface modules (e.g., USB, Fire Wire, RS-232, HDMI, Ethernet, wire line and/or cable modem, etc.); any of a variety of communication interface modules related to communicating with external memory devices; etc. The exemplary user equipment 500 is also illustrated as comprising various wired 506 and/or wireless 505 front-end modules that may, for example, be included in the communication interface modules and/or utilized thereby.

The exemplary user equipment 500 may also comprise any of a variety of signal processing module(s) 590. Such signal processing module(s) 590 may share any or all characteristics with modules of the exemplary user equipment 400 that perform signal processing. Such signal processing module(s) 590 may, for example, be utilized to assist in processing various types of information discussed previously (e.g., with regard to sensor processing, position determination, video processing, image processing, audio processing, general user interface information data processing, etc.). For example and without limitation, the signal processing module(s) 590 may comprise: video/graphics processing modules (e.g. MPEG-2, MPEG-4, H.263, H.264, JPEG, TIFF, 3-D, 2-D, MDDI, etc.); audio processing modules (e.g., MP3, AAC, MIDI, QCELP, AMR, CMX, etc.); and/or tactile processing modules (e.g., keypad I/O, touch screen processing, motor control, etc.).

In summary, various aspects of the present invention provide a system and method for updating advertising content for a recorded program (e.g., recorded on personal video recorder equipment), substantially as shown in and/or described in connection with at least one of the figures, as set forth more completely in the claims. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method executable in user equipment having content playback capability to update a recorded advertising content associated with a recorded program content, the method comprising:
    establishing a communication link of the user equipment via a communication network;
    prior to playback of the recorded program content, determining to solicit updated advertising content for the recorded program content, including determining whether the advertising content of the recorded program content includes outdated time sensitive advertising content by comparing a current date or time with at least one of an expiration date or a time window of the advertising content;
    when the advertising content accessible by the user equipment includes outdated time sensitive advertising content, soliciting the updated advertising content for the recorded program content, including:
- transmitting, via the communication link, a first request for updated advertising content from an original source of the recorded program content; and
- transmitting, via the communication link, a second request for updated advertising content from a second source of advertising content;

when the updated advertising content is available from at least one of the original source of the recorded program content or the second source of advertising content, receiving the updated advertising content via the communication link;

updating the recorded program content with the updated advertising content; and presenting the playback of the recorded program content with the updated advertising content.

2. The method of claim 1, wherein soliciting the updated advertising content further comprising:
- monitoring the communication network to develop a network profile that includes historical network bandwidth utilization information; and
- determining to solicit the updated advertising content during a time period which the historical network bandwidth utilization information identifies as a repetitive time period of relatively low network bandwidth utilization.

3. The method of claim 2, wherein the first request and the second request are transmitted during the time period.

4. The method of claim 1, wherein the determining to solicit updated advertising content further comprising:
- determining to solicit the updated advertising content on a periodic basis.

5. The method of claim 1, the determining to solicit updated advertising content further occurs after an initial playback of the recorded program content.

6. The method of claim 1, wherein the determining to solicit updated advertising content further occurs during playback of the recorded program content.

7. The method of claim 6, wherein the determining to solicit updated advertising content further comprising:
- determining, in response to encountering advertising information in the recorded program content during playback of the recorded program content, to solicit the updated advertising content.

8. The method of claim 6, wherein the determining to solicit updated advertising content further comprising:
- determining when, during playback of the recorded program content, to solicit updated advertising for the recorded program content such that the updated advertising content is received prior to an anticipated presentation time for the updated advertising.

9. The method of claim 1, wherein the determining to solicit updated advertising content further comprising:
- determining, in response to a user input command to playback the recorded program content, to solicit the updated advertising content.

10. The method of claim 1, further comprising:
- replacing the advertising content with the updated advertising content.

11. The method of claim 1, further comprising:
- inserting data in the recorded program content indicating that the updated advertising content is to be played during playback of the recorded program content.

12. User equipment with content playback capability, the user equipment comprising:
- a processor;
- at least one network interface; and
- memory coupled to the processor, wherein the memory stores operational instructions that cause the processor to:
  - establish a communication link via the at least one network interface;
  - record program content, including associated recorded advertising content, received via the at least one network interface;
  - determine, prior to playback of the recorded program content, to solicit updated advertising content for the recorded program content, including determining whether advertising content of the recorded program content includes outdated time sensitive advertising content by analyzing at least one of an expiration date or a time window associated with the advertising content;
  - when the advertising content of the user equipment includes outdated time sensitive advertising content, solicit the updated advertising content for the recorded program content from at least one advertising content source, including:
    - transmitting, via the communication link, a first request for updated advertising content from an original source of the recorded program content; and
    - transmitting, via the communication link, a second request for updated advertising content from a second advertising content source;
  - when the updated advertising content is available from at least one of the original source of the recorded program content or the second advertising content source, receive the updated advertising content from the at least one advertising content source via at least one network interface;
  - update the recorded program content with the updated advertising content; and
  - present the playback of the recorded program content with the updated advertising content.

13. The user equipment of claim 12, wherein the memory further stores operational instructions that cause the processor to:
- determine to solicit the updated advertising content by:
  - monitoring the communication network to develop a network profile that includes historical network bandwidth utilization information; and
  - determine to solicit the updated advertising content during a time period which the historical network bandwidth utilization information identifies as a repetitive time period of relatively low network bandwidth utilization.

14. The user equipment of claim 13, wherein the first request and the second request are transmitted during the time period.

15. The user equipment of claim 12, wherein the memory further stores operational instructions that cause the processor to:
- determine to solicit the updated advertising content on a periodic basis.

16. The user equipment of claim 12, wherein the memory further stores operational instructions that cause the processor to:
- determine, before playback of the recorded program content, to solicit the updated advertising content for the recorded program content.

17. The user equipment of claim 12, wherein the memory further stores operational instructions that cause the processor to:
   determine, during playback of the recorded program content, to solicit updated advertising for the recorded program content.

18. The user equipment of claim 17, wherein the memory further stores operational instructions that cause the processor to:
   determine, in response to encountering advertising information in the recorded program content during the playback of the recorded program content, to solicit the updated advertising content for the recorded program content.

19. The user equipment of claim 17, the memory further stores operational instructions that cause the processor to:
   determine when, during the playback of the recorded program content, to solicit the updated advertising content such that the updated advertising content is received prior to an expected presentation time for the updated advertising content.

20. The user equipment of claim 12, wherein the memory further stores operational instructions that cause the processor to:
   determine, in response to a user input command to the playback of the recorded program content, to solicit the updated advertising content.

21. The user equipment of claim 12, wherein the memory further stores operational instructions that cause the processor to:
   identify a source for the updated advertising content from data stored with the recorded program content.

22. The user equipment of claim 12, wherein the memory further stores operational instructions that cause the processor to:
   insert data in the recorded program content indicating that the updated advertising content is to be played during the playback of the recorded program content.

* * * * *